June 7, 1960   G. B. ELDER ET AL   2,939,480
FUEL PRESSURE REGULATOR
Filed Nov. 23, 1955   2 Sheets-Sheet 2
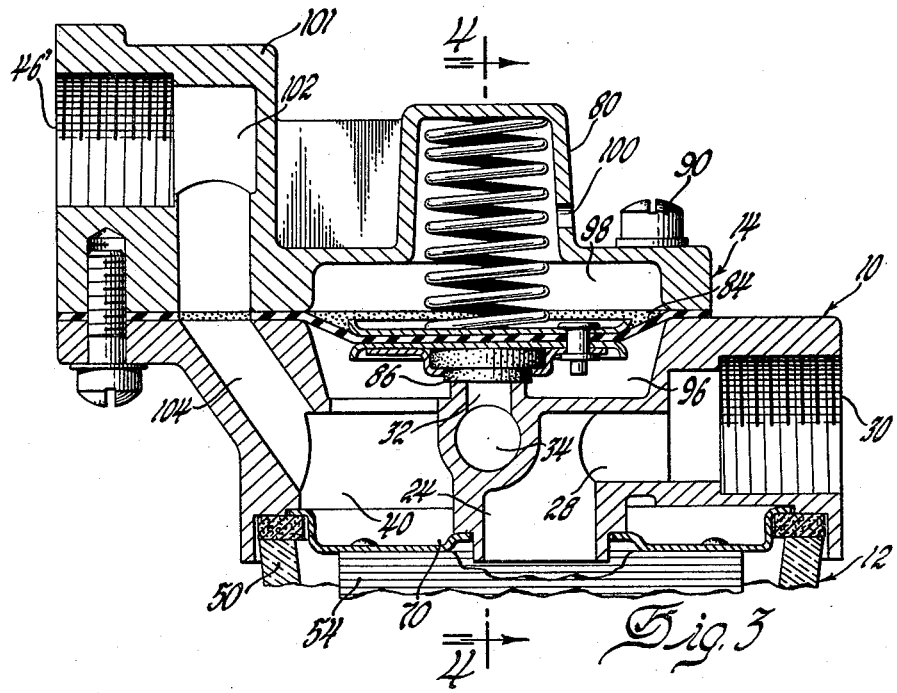
Fig. 3
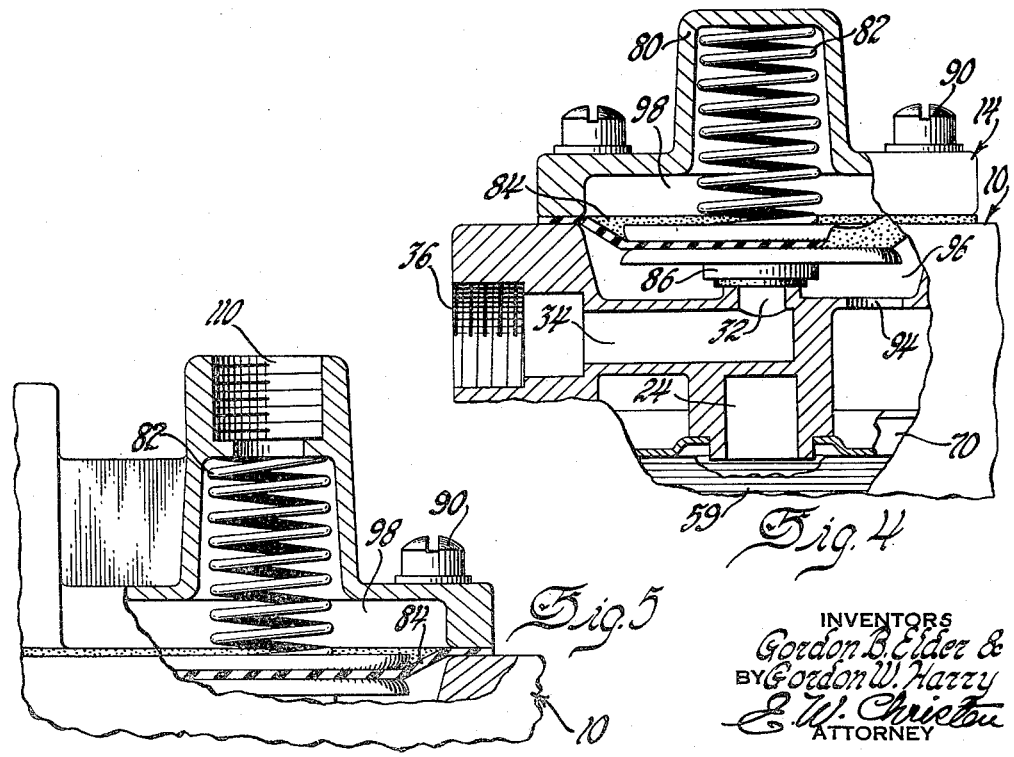
Fig. 4
Fig. 5
INVENTORS
Gordon B. Elder &
BY Gordon W. Harry
ATTORNEY

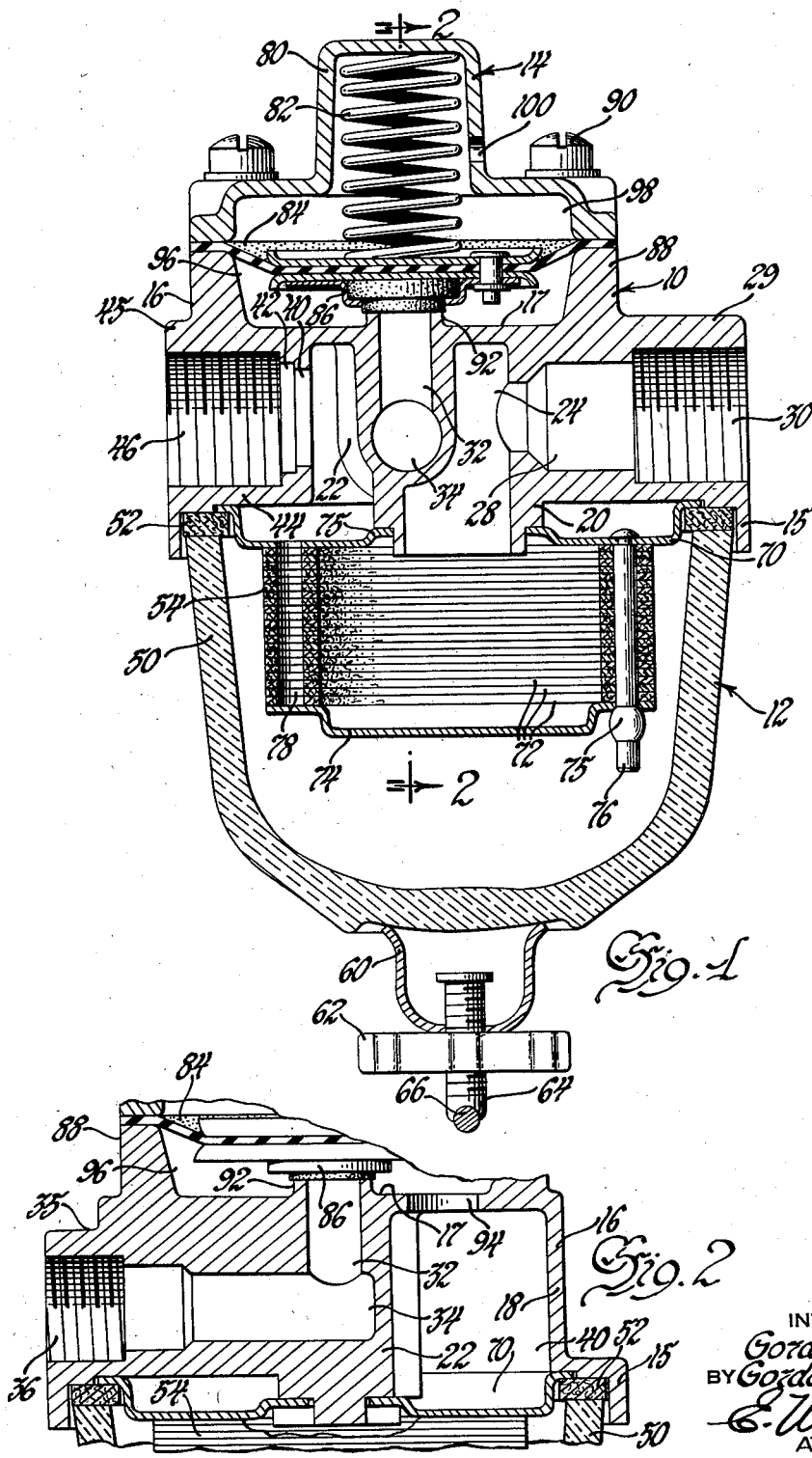

United States Patent Office 2,939,480
Patented June 7, 1960

2,939,480

FUEL PRESSURE REGULATOR

Gordon B. Elder, Flint, and Gordon W. Harry, Flushing, Mich., assignors to General Motors Corporation, Detroit, Mich., a corporation of Delaware Filed Nov. 23, 1955, Ser. No. 548,571

1 Claim. (Cl. 137—546)

This invention relates to fuel pressure regulator and fuel strainer assemblies specially suited for use in internal combustion automotive type engines. The invention has for its objects to provide a fuel pressure regulator and fuel strainer assembly of unitary, compact design using a minimum number of cooperatively associated parts.

The specific novelty of the invention resides in the details of construction and the manner of interassociation of the parts constituting the assembly.

In the drawings:

Fig. 1 is a sectional elevational view of a fuel pressure regulator and fuel strainer assembly in accordance with one embodiment of the present invention;

Fig. 2 is a sectional view with parts broken away taken in the direction 2—2 of Fig. 1;

Fig. 3 is a sectional elevation view with parts broken away of a slightly modified form of fuel pressure regulator and strainer assembly in accordance with another embodiment of the invention;

Fig. 4 is a sectional view with parts broken away taken in the direction 4—4 of Fig. 3; and Fig. 5 is a sectional view with parts broken away of a modification of the fuel pressure regulator and strainer assembly of Fig. 3.

The fuel pressure regulator and strainer assembly illustrated in Fig. 1 includes a main body portion 10, a fuel strainer assembly 12 detachably mounted to and depending from the main body, and a fuel pressure regulator assembly 14 attached to and extending from the body, as shown.

The main body is a cast one-piece member having a lower circular flanged portion 15 and an upper inverted, cup or box-shaped portion 16 having a top wall 17 and a partially circular outer side wall 18. Formed internally of the cup is an irregularly shaped section formed by a pair of transverse intersecting bosses 20 and 22, each extending horizontally inwardly from the side wall and vertically downwardly from the top wall.

The boss 20 has an L-shaped passage therein defining a vertically extending central inlet chamber 24, which is circular at its lower end shown communicating with the fuel strainer, and a horizontally extending inlet passage 28 which communicates at its inner end with the central inlet chamber. The passage 28 extends through the box-shaped portion of the body and an integrally formed outer boss 29 which is aligned axially with the inner boss 20 and has an opening therein defining a fluid inlet port 30. The opening is threaded and adapted to receive a fuel inlet pipe from the outlet of the fuel pump.

The boss 22 has an L-shaped bypass return passage therein defined by a vertically extending passage 32 that extends upwardly through the top wall of the body and communicates with the inner end of a horizontally disposed passage 34. The passage 34 extends through the box-shaped portion of the body and an integrally formed outer boss 35, which is aligned with the internal boss 22 and has an opening therein defining a bypass return outlet 36. The opening is threaded and adapted to receive a bypass return pipe to return fuel to the fuel tank or reservoir of the engine.

Except for the space occupied by the internal bosses 20 and 22, the remaining space within the body defines an outlet chamber 40 which communicates with an outlet passage 42 formed in a short inwardly extending boss 44. The passage 42 extends through the upper portion of the body and an integrally formed outer boss 45 which is axially aligned with the boss 44 and has an opening therein defining a fluid outlet port 46 that is threaded and adapted to receive a pipe connected to the carburetor inlet.

The fuel strainer assembly 12 may be of the type more fully shown in U.S. Patent 2,680,519 to H. W. Rundquist et al. and includes a transparent sediment bowl 50, gasket 52 and an annular edge-type stacked filter element 54 which are received as a unit within an annular recessed portion formed in the lower circular flanged portion 15 of the main body. An abutting cup 60 seats in a recess in the lower portion of the bowl and is engaged by an adjustable thumb wheel 62 and screw 64. The head of the screw is slotted to receive a bail 66 which is pivotally attached to the sides of the main body in conventional manner.

The filter element 54 includes an annular support plate 70 having a central opening therein, a plurality of stacked annular strainer washers 72 formed of impregnated paper or other suitable material, and a backing plate 74, all of which are secured together as by rivets, one of which is shown at 76. The support plate has an offset central portion 75 adjacent the central opening and seated on an annular shoulder on the lower portion of the walled central chamber 24 the end of which passes through the opening. Each of the stacked strainer washers 72 and the support plate 70 is provided with a radial array of elongated arcuate apertures extending completely therearound. The apertures are aligned to provide a plurality of vertical passages, such as is shown at 78, extending through the filter washers. The backing plate 74, positioned at the bottom of the stack of washers, is not apertured at the lower ends of the vertical passages 78 and, therefore, seals the latter. The small apertures in the support plate 70 are aligned with each of the vertical passages 78 formed by the apertures in the filter washers 72 to provide an outlet for the filtered fluid passing into the outlet chamber 40.

The pressure regulating assembly 14 comprises a dome-shaped housing member 80, a spring 82, a flexible diaphragm 84 and a disk valve 86 carried by the diaphragm. The diaphragm and the housing member are supported on an upwardly extending integrally formed flanged portion 88 of the main body and are attached thereto by the screws 90 with the diaphragm clamped between the flange 88 and the rim of the dome. The valve 86, carried by the diaphragm, is urged by the spring 82 against an upwardly extending annular abutment 92, which surrounds the ported end of the vertical bypass passage 32 and provides a seat for the valve.

The top wall 17 of the body has an opening 94 formed therein by means of which fluid communication is established between the outlet chamber 40 and a pressure regulating chamber 96 defined by the lower side of the diaphragm and the upper surface of the top wall of the body. The dome 80 forms with the upper side of the diaphragm 84 a chamber 98 having an atmospheric vent 100 therein to reference the regulated pressure to atmosphere. By providing the opening 94 between the central inlet chamber 24 (instead of the outlet chambers 40) and the pressure regulating chamber 96, unstrained fluid could be returned through the bypass return passage, if desired.

The flow circuit through the device extends from the inlet 30, horizontally through the inlet passage 28, and vertically downwardly through the central chamber 24 into the annular filter assembly and the sediment bowl. In order to reach the outlet chamber, the fuel must pass through the edges of the filter, which is interposed between the inlet and outlet. The strained fuel then passes upwardly through the vertically extending passages 78 formed in the filter washers into the outlet chamber 40 and out to the fluid outlet port. Part of the strained fluid also passes through the opening 94 into the pressure regulating chamber 96 subjecting the diaphragm to the fluid pressure working against atmospheric pressure and the spring force tending to seat the valve 86 against the abutment 92.

The apparatus is adapted to be connected between the fuel pump outlet and the carburetor inlet of an internal combustion automobile engine and permits the use of high pressure pumps without flooding the carburetor at idle. When the fuel demand of the engine is low, the bypass valve 86 is lifted to permit communication between the pressure regulating chamber 96 and the bypass return passage 32 to return excess fuel to the fuel tank of the engine. When the engine is operating at maximum speeds, the bypass valve would be closed and all of the effective pressure would be used to move fuel to the carburetor. At intermediate speeds and engine demands, the valve will serve to regulate the outlet fluid pressure and keep it substantially constant.

In the embodiment shown in Figs. 3 and 4 the domed housing member is provided with an integrally formed boss portion 101 having an L-shaped passage 102 therein communicating with an inclined outlet passage 104 in the main body, the construction enabling the fuel outlet port 46' of the device to be elevated above the inlet port 30 in the main body.

In the embodiment of Fig. 5, the atmospheric dome vent is omitted and a tapped port 110 substituted therefor at the top of the dome 80 through which the chamber 98 may be supplied with compressed air from a supercharger or other pressure source. Introducing supercharger air, for example, produces a false atmosphere on one side of the diaphragm, and the spring then regulates its fixed increment above that pressure.

What is claimed is:

A fuel pressure regulator and fuel strainer assembly in the form of a compact unit including a main body defining an inlet freely communicating with an inlet chamber for receiving fuel under pressure from a source of supply, an outlet chamber in said body and substantially surrounding said inlet chamber, a diaphragm cooperating with an upper portion of said body to define a pressure regulating chamber, a by-pass outlet passage defined by said main body and leading from said pressure regulating chamber, said by-pass outlet passage being adapted to be connected to said source of supply, a valve controlling said by-pass outlet passage and arranged to be actuated by said diaphragm, a spring biasing said valve to its closed position, a port in said main body connecting said outlet chamber to said pressure regulating chamber, the lower ends of said inlet and outlet chambers being open, a filter element traversing a path of fluid communication between said inlet and outlet chambers, and a bowl dependent from said main body and enclosing said path and filter element.

References Cited in the file of this patent

UNITED STATES PATENTS

| | | |
|---|---|---|
| 1,697,865 | Hahn et al. | Jan. 8, 1927 |
| 1,620,322 | Browne | Mar. 8, 1927 |
| 1,863,103 | Dowins | June 14, 1932 |
| 2,422,647 | Vokes | June 17, 1947 |
| 2,536,663 | Schaer | Jan. 2, 1951 |
| 2,633,146 | Witt | Mar. 31, 1953 |
| 2,680,519 | Rundquist et al. | June 8, 1954 |
| 2,707,051 | Mailhot | Apr. 26, 1955 |
| 2,774,374 | Schneider | Dec. 18, 1956 |

FOREIGN PATENTS

| | | |
|---|---|---|
| 644,373 | France | June 5, 1928 |